United States Patent [19]

Crawford

[11] 4,225,025
[45] Sep. 30, 1980

[54] FRICTION CLUTCH

[75] Inventor: Peter F. Crawford, Coventry, England

[73] Assignee: Automotive Products Limited, Warwickshire, England

[21] Appl. No.: 895,458

[22] Filed: Apr. 11, 1978

[51] Int. Cl.² ............................................. F16D 13/70
[52] U.S. Cl. .................................. 192/70.2; 188/71.1; 188/71.5
[58] Field of Search ............... 192/70.19, 70.2, 70.27, 192/89 B; 308/239; 188/71.1, 71.5

[56] References Cited

U.S. PATENT DOCUMENTS

| 1,287,257 | 12/1918 | De Waters | 192/70.19 |
| 1,554,394 | 9/1925 | White | 192/70.19 |
| 2,729,319 | 1/1956 | Friedman | 192/70.2 X |
| 2,804,176 | 8/1957 | Trevaskis | 188/71.5 |
| 3,305,060 | 2/1967 | Zeidler | 192/70.19 |
| 3,543,899 | 12/1970 | Colbert et al. | 192/70.2 X |
| 3,605,967 | 9/1971 | Warren et al. | 192/70.2 X |
| 3,698,518 | 10/1972 | Boyles | 192/70.19 X |
| 3,791,499 | 2/1974 | Ryan | 192/89 B X |
| 4,081,064 | 3/1978 | Smith et al. | 192/70.2 X |

FOREIGN PATENT DOCUMENTS

| 1963157 | 6/1971 | Fed. Rep. of Germany | 192/89 B |
| 2124443 | 11/1972 | Fed. Rep. of Germany | 192/70.19 |
| 2608348 | 9/1976 | Fed. Rep. of Germany | 192/70.2 |
| 555295 | 8/1943 | United Kingdom | 192/70.2 |
| 1256459 | 12/1971 | United Kingdom | |
| 1256460 | 12/1971 | United Kingdom | |

Primary Examiner—Rodney H. Bonck
Attorney, Agent, or Firm—Kemon & Estabrook

[57] ABSTRACT

A clutch cover for a motor vehicle friction clutch with typical construction having a driven plate gripped between a pressure plate and a flywheel. The clutch cover is secured to the flywheel and has a plurality of spacers spacing the cover from the flywheel, wherein the spacers incorporate wear resistant pieces through which torque is transmissible between the spacers and the pressure plate and against which the pressure plate can slide during operation of the clutch.

2 Claims, 4 Drawing Figures

FRICTION CLUTCH

This invention relates to friction clutch assemblies and to covers therefor.

In motor vehicle friction clutches it is well known for the clutch assembly to employ a clutch cover secured to a flywheel for securing and guiding the pressure plate and release springs. The clutch cover enclosing the pressure plate and a driven plate is gripped between the flywheel and pressure plate. In order for the torque transmission to pass from the flywheel to the driven plate it is necessary for the pressure plate to be rotationally fast with the cover but to be free to move relative to the cover along the axis of rotation of the clutch so that the driven plate may be released during operation of the clutch.

One method of making the pressure plate rotationally fast with the cover but axially movable relative thereto is to have radial lugs on the pressure plate projecting through co-operating aparatus in the cover so that the lugs abut the sides of the apertures and prevent relative rotational movement.

Yet another method is for the cover to be spaced away from the flywheel by spacers secured thereto and for the lugs toabut the spacers. Such a construction is shown in British Pat. No. 1,256,459 and British Pat. No. 1,256,460 which we consider to be the closest prior art.

A major disadvantage with the construction shown in the aforementioned specifications is that for large capacity clutches such as those fitted to racing cars, which must necessarily be of a light construction and therefore usually have aluminium covers, the torque transmissions involved caused the steel pressure plate to wear away the aluminium cover during operation of the clutch. This wear of the cover can cause a serious reduction in the efficiency of the clutch mechanism particularly with multi plate clutches where a series of driven plates are sandwiched between a series of pressure plates.

The object of the present invention is to minimise the above mentioned problems.

According to the present invention there is provided a clutch assembly including a cover adapted to be secured to a flywheel or other driving member, a pressure member for pressing a driven member against the driving member, and a plurality of separate spacers for spacing the cover from the driving member, wherein the spacers incorporate wear resistant pieces through which torque is transmissible between the spacers and the pressure members and against which wear resistant pieces the pressure member slides. With this arrangement the spacers themselves do not become worn during the operation of the clutch because they are not in direct contact with the pressure member. The spacers may, therefore, be made of a material, for example aluminium, which is sensitive to wear, even though the clutch is to be subjected to abnormal driving conditions such as in a sports car. By making wear pieces from a suitably wear resistant material, it may be ensured that the wear which does take place is borne primarily by the pressure member so that the clutch does not become more difficult to disengage as wear increases.

Preferably, each wear piece is in the form of a rollpin received with an interference fit within a groove in the associated spacer. Alternatively, each wear piece may be in the form of a clip having its ends engaging with the associated spacers.

The invention also provides a clutch including a flywheel or other driving member and a clutch assembly as defined above, the spacers being interposed between the driving member and the cover and being held in place by screw-threaded fasteners which secure the cover to the driving member and each of which passes through a respective one of the spacers.

The invention further provides a clutch cover having spacers projecting therefrom, the spacers having axially extending grooves in which are received wear resistant inserts for sliding contact with a pressure member.

Two embodiments of the invention will now be described, by way of example, with reference to the accompanying drawings in which.

Figure 1:
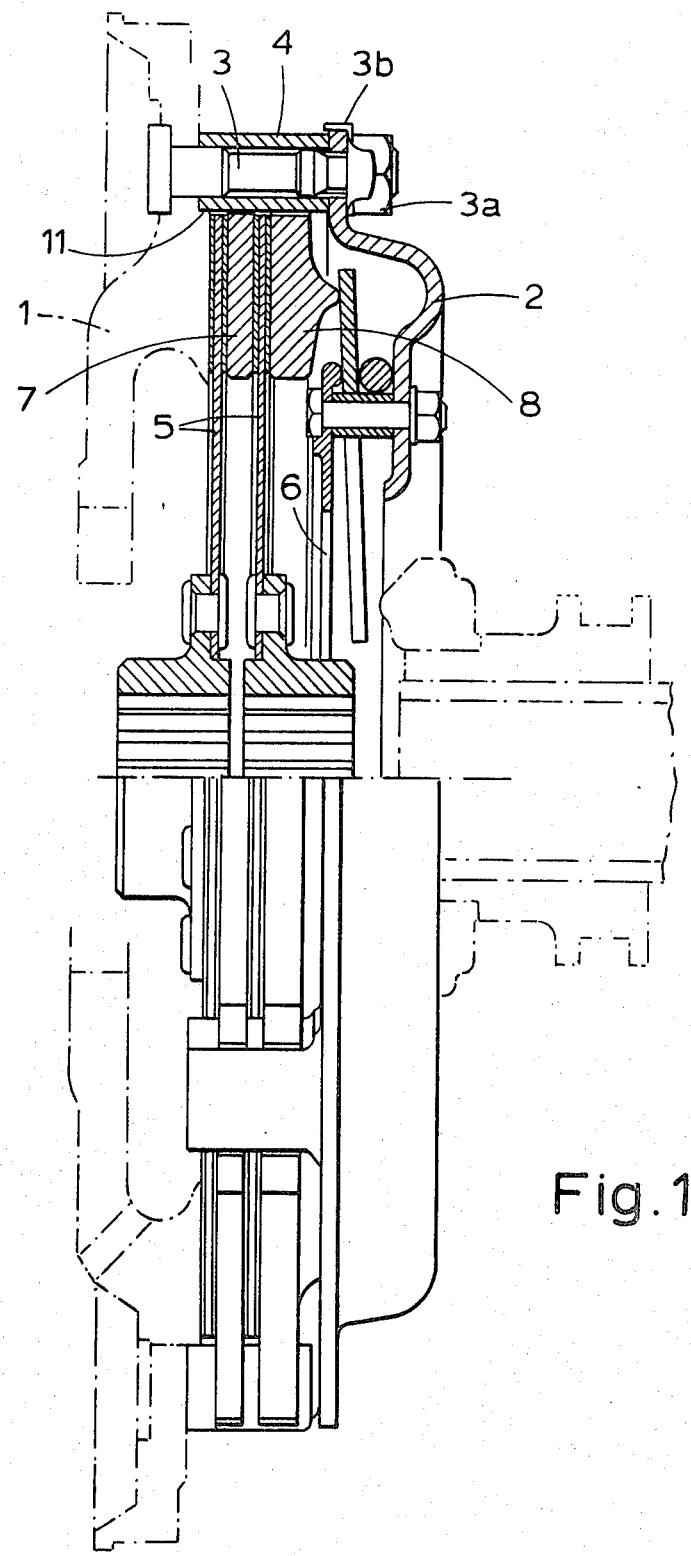
FIG. 1 is an axial section taken through a first embodiment of clutch.
Figure 2:
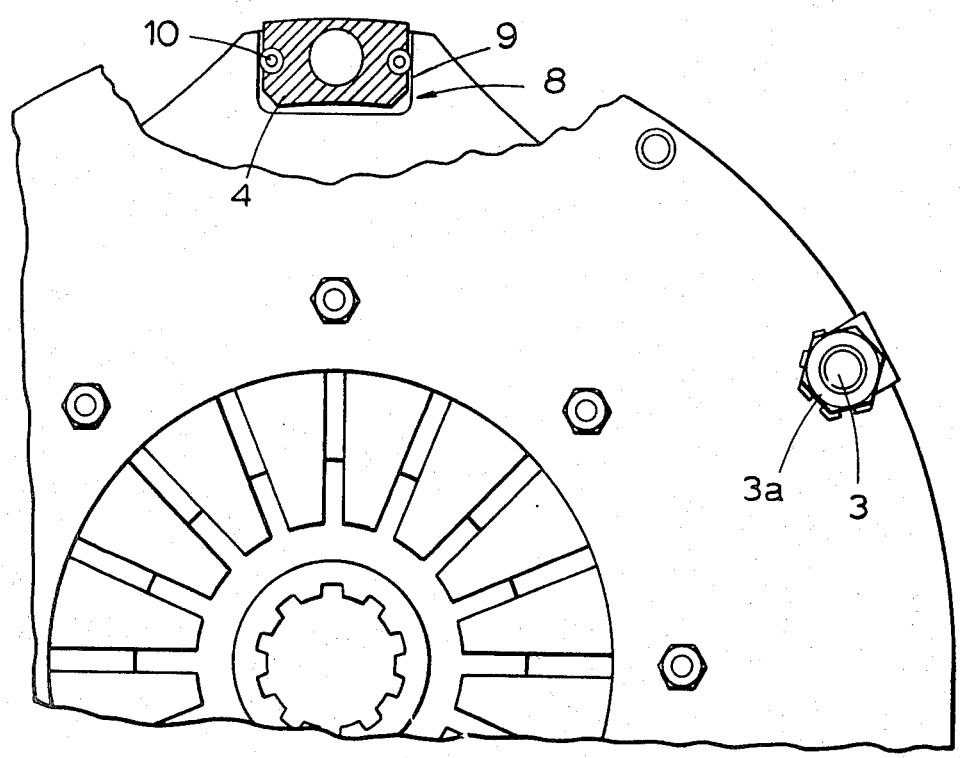
FIG. 2 is a partly sectioned end view of the clutch shown in FIG. 1, looking from the right of FIG. 1.

Referring to FIGS. 1 and 2 of the drawings, a twin plate clutch includes a driving member such as a flywheel 1 to which a pressed or spun cover 2 is secured by studs 3 onto which nuts 3a are screwed over tabbed washers 3b. The cover is spaced from the flywheel by separate spacers 4 cut from an aluminium extrusion. Each of the spacers 4 has a central bore through which a respective stud 3 is passed. The spacers abut against the cover and flywheel at their ends, being seated against a circumferential step 11 on the flywheel.

The driven plates 5 of the clutch are urged towards the left in FIG. 1 by a diaphragm spring 6 acting through high tensile steel pressure plates 7 and 8. Formed in the periphery of each of the plates 7 and 8 is a plurality of apertures 9 which receive the spacers 4 with a clearance.

As can be seen from FIG. 2, each of the radial sides of the spacers 4 is provided with a groove of circular cross-section with a mouth which is narrower than the groove diameter so that a rollpin 10 may be retained therein but will have a part of its peripheral surface standing proud of the side face of the spacer. The rollpin is formed by rolling steel strips into a cylinder having an unstressed diameter greater than that of the groove in which it is seated so that it is held tightly in place by an interference fit.

The rollpins of each spacer bear against the edge of the aperture 9 in which the spacer is received so that torque is transmitted between the flywheel and pressure plates by way of the rollpins. The pressure plates slide against the rollpins as the clutch engages and disengages but any wear which takes place is in the pressure plates so as to avoid difficulty bringing about disengagement.

Figures 3, 4:
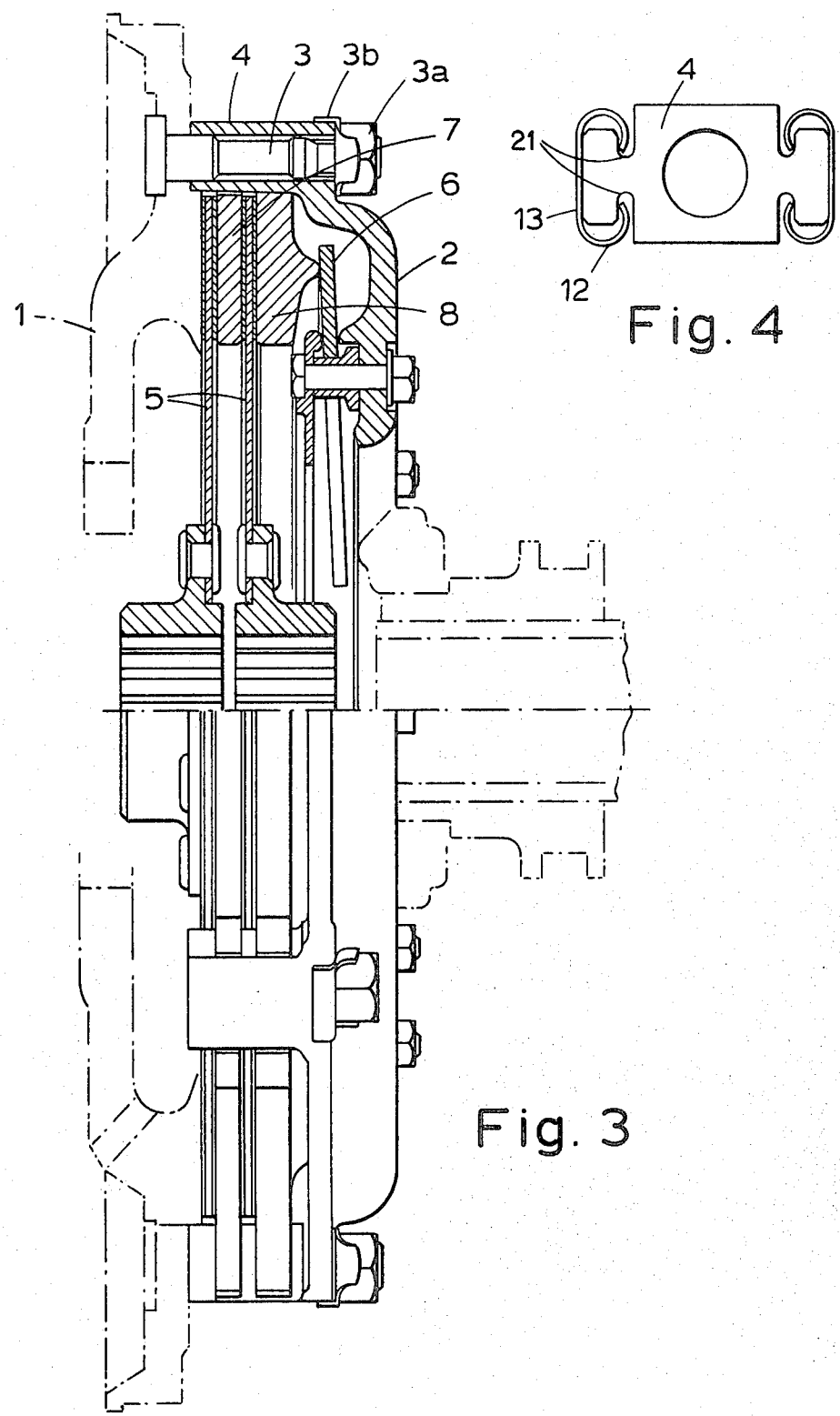
FIG. 3 is an axial section through a second embodiment of clutch.
FIG. 4 is a section through a modified spacer.

FIG. 3 is an axial section through a second embodiment of clutch, which includes cover 2 which may be cast from aluminium and is secured to the flywheel 1 by waisted studs 3, nuts 3a and washers 3b as in the first embodiment.

In this embodiment, the studs pass through spacers 4 which are in the form of lugs cast integrally with the cover. Each lug is grooved to receive rollpins, so that a section through the lug is identical to FIG. 2.

In connection with either embodiment, inserts other than rollpins may be used to provide bearing surfaces against which the pressure plates slide. Thus, for example, each spacer may be formed with two grooves, each of which is of trapezoidal cross-section, the mouth constituting the shorter of the parallel sides of the figure, and each of which grooves receives a trapezoidal sectioned insert of sintered nickel iron, for example; a part of the insert projecting from the groove to engage the pressure plate. Obviously, each of the two faces may be provided with more than one insert.

It is also possible for each of the spacers to be provided with externally supported wear pieces. Thus, in the modified spacer shown in FIG. 4 the spacer 4 is provided with a pair of longitudinal grooves 21 adjacent each radial side. One groove in each pair faces radially outwards and the other radially inwards so as to retain the ends of a respective one of two spring steel clips 12 having plane faces 13 which contacts with the edges of the aperture 9.

The invention is not confined in application to twin-plate clutches but is applicable generally to single and multiple plate clutches of suitable type.

I claim:
1. A friction clutch assembly having:
   a cover;
   a driving member fast with the cover;
   a pressure plate rotationally fast with the cover and movable along the axis of rotation of the clutch relative to the cover and located axially between the cover and the driving member;
   a driven plate located between the pressure plate and the driving member;
   a plurality of spacers secured to the cover and spacing the cover from the driving member;
   grooves located on each radial side of each of said spacers;
   wear resistant pieces force fitted one into each groove such that a portion of the wear piece is proud of the groove and through which torque is transmissible between the spacers and the pressure plate and against which wear pieces the pressure plate axially slides;
   each wear piece being in the form of a hollow cylindrical pin received with an interference fit within a groove in the associated spacer; and
   said pin is a rolled steel strip forming a cylinder having an unstressed diameter greater than the groove into which it is fitted.
2. In a motor vehicle friction clutch,
   a clutch cover;
   spacers projecting from the cover axially relative to the axis of rotation of the clutch, and which space the cover from a flywheel;
   grooves located, one in each radial side of each spacer and also extending axially; and
   wear resistant hollow cylindrical pins received with an interference fit, one pin in each groove, each of said pins being a rolled steel strip forming a cylinder having an unstressed diameter greater than the groove into which it is fitted.

* * * * *